United States Patent
Appleyard

(10) Patent No.: US 6,903,327 B1
(45) Date of Patent: Jun. 7, 2005

(54) LASER GUARDED INDUSTRIAL PRESS SAFETY SYSTEM

(75) Inventor: Robert Meredith Appleyard, Hillarys (AU)

(73) Assignee: Lazer Safe Pty. Ltd., Malaga (AU)

( * ) Notice: Subject to any disclaimer, the term of this patent is extended or adjusted under 35 U.S.C. 154(b) by 0 days.

(21) Appl. No.: 09/980,562

(22) PCT Filed: May 5, 2000

(86) PCT No.: PCT/AU00/00420

§ 371 (c)(1),
(2), (4) Date: Jun. 11, 2002

(87) PCT Pub. No.: WO00/67932

PCT Pub. Date: Nov. 16, 2000

(30) Foreign Application Priority Data

May 5, 1999 (AU) ................................ PQ0221

(51) Int. Cl.⁷ .................................................. G06M 7/00
(52) U.S. Cl. .......................... 250/221; 72/21.1; 72/14.3
(58) Field of Search ................................ 250/221, 216; 72/1–4, 20.1–20.5, 21.1, 14.3

(56) References Cited

U.S. PATENT DOCUMENTS

| | | | |
|---|---|---|---|
| 3,704,396 A | | 11/1972 | MacDonald .................. 361/175 |
| 4,127,771 A | | 11/1978 | Sick .............................. 250/221 |
| 4,170,417 A | * | 10/1979 | Tourres ........................ 356/634 |
| 4,249,074 A | * | 2/1981 | Zettler et al. ................ 250/221 |
| 4,357,820 A | | 11/1982 | Blanchard ................... 72/389.4 |
| 4,527,684 A | | 7/1985 | Eggeman et al. ............ 192/130 |
| 5,579,884 A | | 12/1996 | Appleyard et al. .......... 192/130 |

FOREIGN PATENT DOCUMENTS

| | | |
|---|---|---|
| AU | 667057 | 4/1993 |
| EP | 789182 A1 | 8/1997 |
| FR | 2 540 224 A | 3/1984 |
| GB | 1 307 078 | 2/1973 |
| WO | WO 97/25568 | 7/1997 |

* cited by examiner

Primary Examiner—Thanh X. Luu
(74) Attorney, Agent, or Firm—Woodcock Washburn LLP

(57) ABSTRACT

A safety system for an industrial press having a moveable section (30), the safety means including: a laser emitting means (1) for emitting a continuous planar laser beam (9) having a generally constant lateral width; a light receiving means (22) for receiving the laser beam and for detecting when an object intersects the laser beam; and a control means for stopping or preventing movement of the moveable section of the press when the receiving means detects that the laser beam has intersected an object.

22 Claims, 6 Drawing Sheets

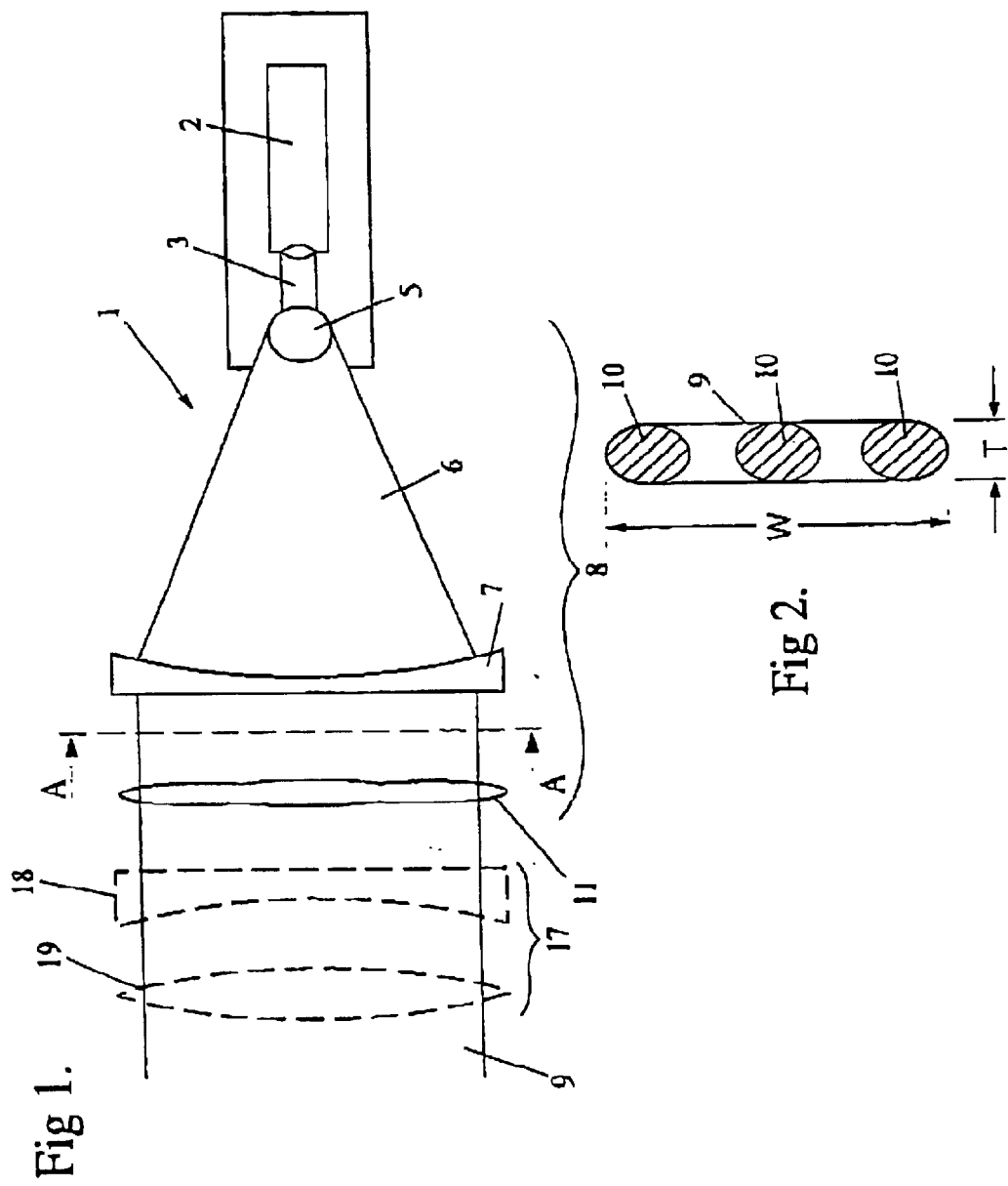

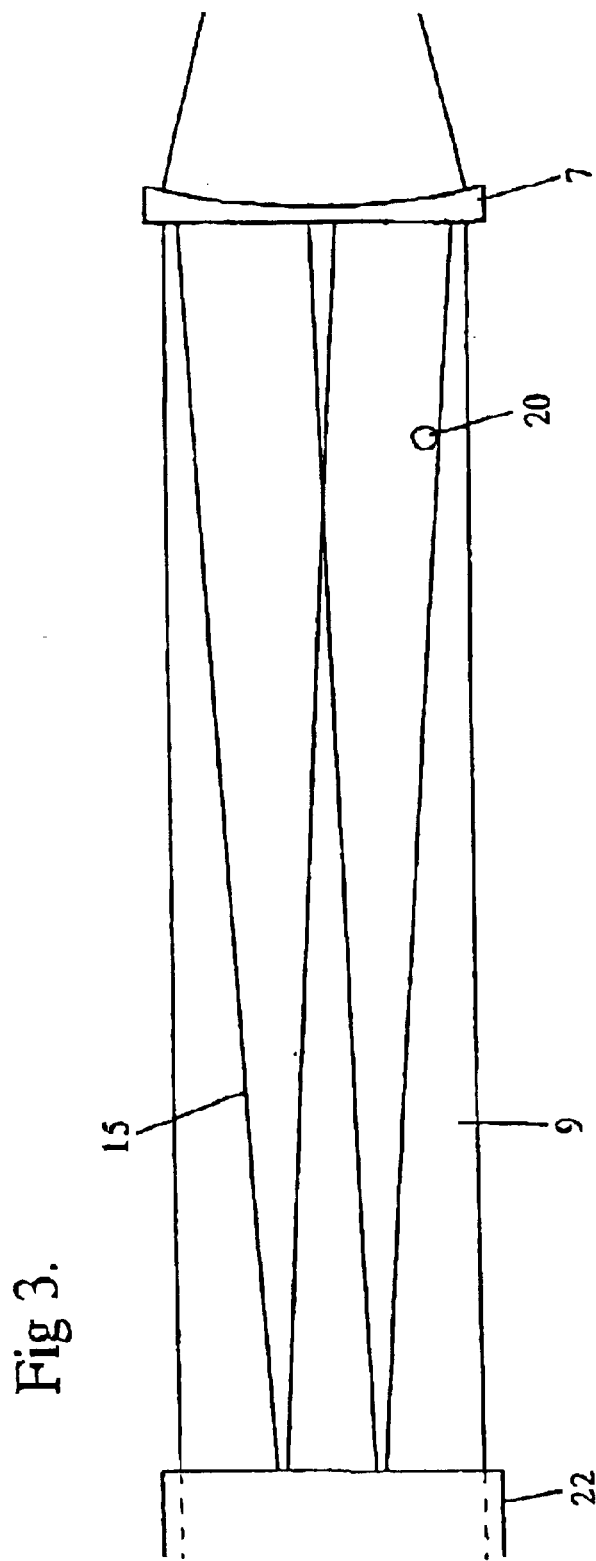

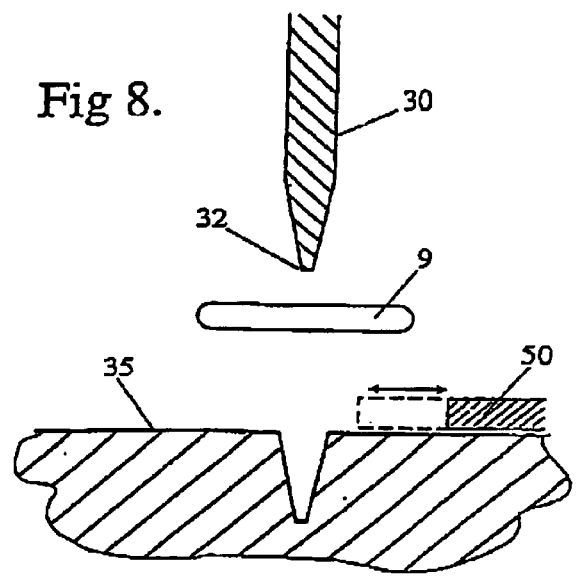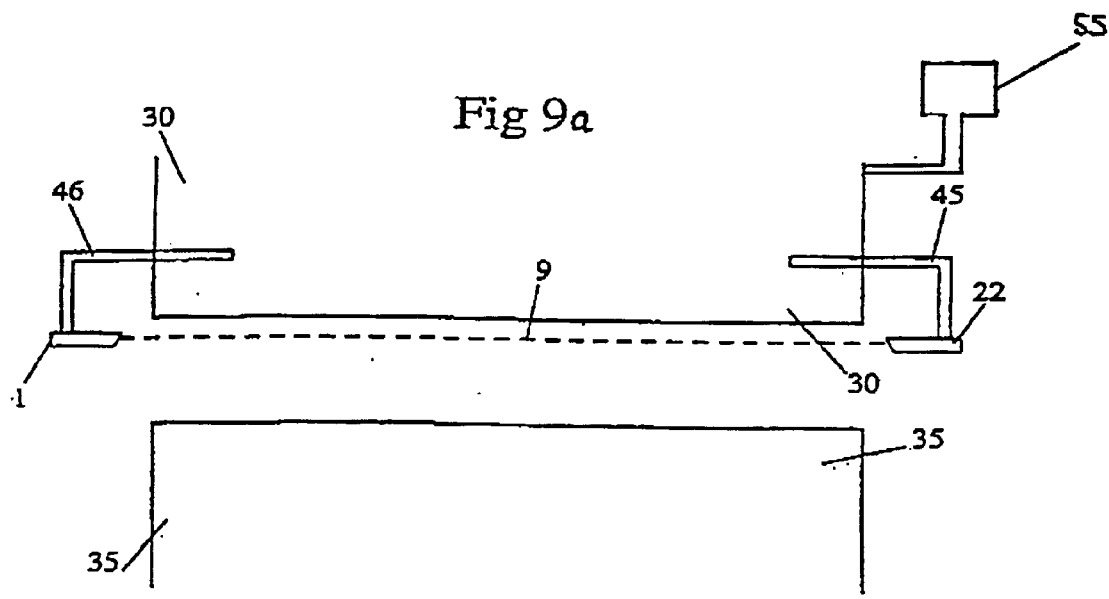

LASER GUARDED INDUSTRIAL PRESS SAFETY SYSTEM

The present invention is generally directed to safety systems used in industrial applications, and in particular to safety systems for use on industrial presses such as a press brake or guillotine, The dangers associated with the operation of industrial presses has necessitated the development of various safety arrangements to protect workers using such presses. Safety light curtain systems are commonly used to provide a plurality of parallel infrared (IR) light beams as a "barrier" for the press. The breaking of any of the IR light beams by the operator of the press results in the stopping of the operation of the press. Those safety light curtains must however be located a significant distance in front of the press to operate with any effectiveness. This is because of the degree of dispersion of the IR light beams over the extended distances limits the accuracy and speed of operation of such light curtains.

In British Patent No. 1307078, there is described a light curtain guard for a press brake of the kind having an upward stroking ram, commonly known as an upstroking press brake. The light curtain guard is also formed by a series of parallel light beams, the main difference being that the light curtain guard is supported an and moveable with the upward stroking ram. It should be noted that both upstroking press brakes and downstroking press brakes having a downward stroking ram are well known in the market.

Cynum industrie S.A. have since around 1981 been marketing a press brake having a safety apparatus including a laser emitter and receiver mounted on opposing sides of the bottom anvil of the press brake and emitting single laser beam close to the surface of the anvil. In an upstroking machine, the laser emitter and receiver move together with the anvil.

In Australian Patent No. 667057, there is described a safety apparatus for use on a downstroking press brake having a moving upper blade and stationary anvil. The safety apparatus differs from the Cynum press brake in being mounted on the upper blade rather than on the anvil, the safety apparatus otherwise operating in the same manner by emitting at least one beam of light in close relation to the leading edge of the upper blade. The light beam can be either an IR or a laser beam.

Fiessler Electronik are marketing a press brake safety apparatus similar to the apparatus described in the abovenoted Australian Patent, but includes additional parallel laser beams for providing a larger safety zone adjacent the upper blade of the press brake.

In all of the above-described systems the breaking of the one or more light beams causes the press brake to stop or prevents the press brake from operating. Furthermore, the safety apparatus in all of the above press brakes are mounted on and movable with the moving part of the press brake, whether it is the upper blade or the bottom anvil.

The above noted Systems however have certain disadvantages. Firstly because all of the above arrangements rely on one or a series of parallel IR or laser beams to provide a barrier, there is always the possibility of the safety light curtain being inadvertently bypassed by an object passing the light beam or passing between adjacent parallel light beams and not breaking any of the light beams. The single light beam or safety light curtain is therefore ineffectual under these circumstances.

Also, in the case of arrangements using laser beams, vibrations can seriously distort the path of the laser beam causing disruptions and inaccuracies in the operation of such arrangements. Although the use of software "filtering" or compensation can be used to minimise the effect of vibrations as for example shown in International Application No. PCT/AU97/00005, this results in an increase in the delay between the breaking of the light beam and the subsequent actuation of the safety system to stop the press. Such delays should preferably be minimised as far as possible, and preferably eliminated.

It is therefore an object of the present invention to provide a safety system for an industrial press that overcomes at least one of the disadvantages associated with the prior art.

With this in mind, the present invention provides a safety system for an industrial press having a moveable section, the safety means including:

a laser emitting means for emitting a continuous planar laser beam having a generally constant lateral width;

a light receiving means for receiving the laser beam and for detecting when an object intersects the laser beam; and a control means for stopping or preventing movement of the moveable section of the press when the receiving means detects that the laser beam has intersected an object.

The use of a continuous planar laser beam having a generally constant lateral width means that the laser beam can cover a relatively wide area when compared with a conventional laser beam while at the same time ensuring that there are no "spaces" through which an object can pass without detection.

The industrial press can for example be a press brake having a blade and an anvil moveable relative to each other. The laser beam may be emitted immediately adjacent the leading edge of the blade. According to one preferred embodiment of the present invention, the plane of the laser beam may be horizontal and located between the blade and anvil of the press brake. Furthermore, the laser emitting means and the light receiving means may be mountable on the blade, and may move with the blade it that part is the moveable section of the press brake. This ensures that the introduction of an object close enough to the blade to intersect the laser beam will stop or prevent the operation of the press. Alternative orientations of the laser beam are however also envisaged. For example, the laser beam can be emitted in front of the blade with the plane of the laser beam being generally vertical. Alternatively, the safety system may emit a plurality of planar laser beams. For example, laser beams can be emitted both in front of and under the cutting blade. This provides an "L" shaped configuration of planar laser beams.

The laser emitting means may include a laser emitter, for example a laser diode for emitting a laser beam, and a lens assembly for varying the configuration of the laser beam emitted from the laser diode. Laser beams emitted by such laser emitters are typically circular in cross section. The lens assembly converts this laser beam into a laser beam of generally planar shape and having a generally constant lateral width. It should be noted that some dispersion of the laser beam may occur the further away a point on the laser beam is from the laser emitter. This dispersion is however relatively insignificant within the range of distances that the laser beam must be emitted over, typically between 2 to 12 meters.

The lens assembly may include a cylindrical prism for initially expanding the laser beam into a laser beam having a planar fan shaped configuration. The lens assembly may also include a converging lens for refocussing the fan shaped laser beam to a planar laser beam having a generally constant lateral width. The original laser beam emitted from the laser emitter has virtually parallel "lines of light". The light intensity when measured across the lateral width of the planar laser beam can however vary. This is due to the refractive effect of the lens on the laser beam which can cause a deflection in the lines of light within the laser beam resulting in an overlapping of the lines of light therein. The "shadow" produced by an object intersecting the laser beam may therefore not be detected by the receiving means as the lines of light passing the object can overlap thereby obscuring any shadow produced by the object. A correcting lens may therefore need be provided after the converging lens to straighten the lines of light of the laser beam refocussed through the converging lens. This correcting lens may for example be in the form of a lenticular lens having a plurality of lens sections which respectively straighten the portion of the laser beam passing therethrough. Alternatively, a series of separate parallel lenses may be placed side to side in front of the converging lenses, each lens correcting a portion of the laser beam. This will ensure that the lines of light of the laser beam are generally parallel, and that an object intersecting the corrected laser beam will cast a clear shadow an the receiving means. According to another preferred arrangement, the lines of light of the laser beam may be straightened by a series of correcting lenses located one after each other. For example, the lens series may include a combination of a convex and concave lens located in series. This lens series may be used in place of or together with the lenticular lens. Additional lenses may be provided depending on the required accuracy of the correction of the planar laser beam.

The light receiving means may include a plurality of electronic light receivers aligned on along a common axis as a light receiver array. The light receiver array may be located at one end of a receiver body. Each light receiver may be located at the end of a light receiving passage provided through the receiver body to prevent other light, eg. reflected light, from effecting the reading obtained from the light receiver. These light receiving passages may be configured to only see light emitted by the laser beam. The light receiving passage may be in the form of a cylindrical bore provided within a solid block providing the receiver body, the bore extending most of the way or completely through the block A plurality of said light receiving passages may be aligned in a parallel relation through the solid block. The light receivers may be provided at the and of each passage, the opposing end of the passages being exposed to and aligned with the lateral extent of the planar laser beam.

Alternatively, the light receiving means may include a focussing arrangement, for example a "cylindrical" lens in front of the light receivers. Each light receiver may be located at the end of a light receiving passage. The passage may be provided by a box shaped enclosure separated into separate parallel passages by dividing walls. The cylindrical lens may be an elongate lens having a relatively uniform cross-section along its length. One side of the lens may have a constant radius of curvature, while the other side of the lens may be generally flat. Such a lens focuses in one plane only and has a fixed focal point. It is however also envisaged that a plurality of lenses may be provided in from of the light receivers. The above described arrangement helps to ensure that the laser beam is focussed on to the light receivers, even where there is some displacement of the laser beams.

It has been found in practice that it is also possible to eliminate the need for any separators in the enclosure for separating the planar laser beam. The enclosure may therefore be completely hollow except for the light receiver array at one end of the enclosure, and the cylindrical lens on the other side thereof. This is because as long as the planar laser beam enters the enclosure parallel to the sides of the enclosure, then all of the light receivers will be receiving light. If the planar laser beam however enters at an angle to the sides of the enclosure, then a "shadow will be cast on at least one of the end light receivers of the light array thereby stopping the operation of the press.

All the light receivers may be aligned with and exposed to the same continuous planar laser beam during operation of the safety system according to the present invention. Therefore any vibration of the press which results in lateral deflection of the laser beam within a predetermined range should not effect the operation of the receiving means. This is because all the light receivers may still be exposed to the same laser beam even when there is a lateral deflection of the laser beam as the width of the laser beam may be wider than the width of the light receiver array. The safety system according to the present invention can therefore be relatively insensitive to vibration of the press where the vibrations primarily result in lateral deflection of the laser beam.

As it can therefore be possible to avoid the need for any software compensation for the vibration effect on the laser beam, and any intersection by an object of the laser beam can result in a direct signal being provided to the control means to stop or prevent movement of the press thereby eliminating or minimising any delay from the breaking of the laser beam to the stopping of the press. The control means can be in the form of an electronic control unit which receives signals from the light receivers and controls the operation of the press.

To improve the operational control of the safety system, the light receivers may be grouped into separate sections. Each section of light receivers may provide their own separate control signal. The light receivers can, for example, be grouped into a front section, a mid section and a rear section.

Both the laser emitting means and the light receiving means may be respectively mounted on supports on opposing sides of the moveable section of the press. The supports may be respectively adjustable to allow the alignment and position of the laser emitting means to be adjusted. For example, where the moveable section is a bending or cutting blade, blades of different heights can be used, and the position of the laser emitting means and light receiving means will need to be adjusted. Alternatively, only the laser emitting means need be adjusted, the light receiving means remaining fixed. This is, for example, possible where the light receiving means includes a said focussing arrangement in front of the light receivers.

It will be convenient to further describe the invention by reference to the accompanying drawings which illustrate a preferred embodiment of the present invention. Other embodiments of the invention are possible, and consequently the particularity of the accompanying drawings is not to be understood as superseding the generality of the proceeding description of the invention.

IN THE DRAWINGS

FIG. 1 is a schematic view of a laser diode and lenses assembly according to the present invention;

FIG. 2 is a cross-sectional view of a continuous planar laser beam emitted by the safety system taken along line A—A in FIG. 1 prior to correction according to the present invention;

FIG. 3 is a plan view of the continuous planar laser beam emitted by the safety system prior to correction according to the present invention;

FIG. 8 is a cross-sectional detail view of an industrial press showing the location of the laser beam; and FIG. 9a is a schematic view of the safety system mounted on an industrial press.

Figure 4:
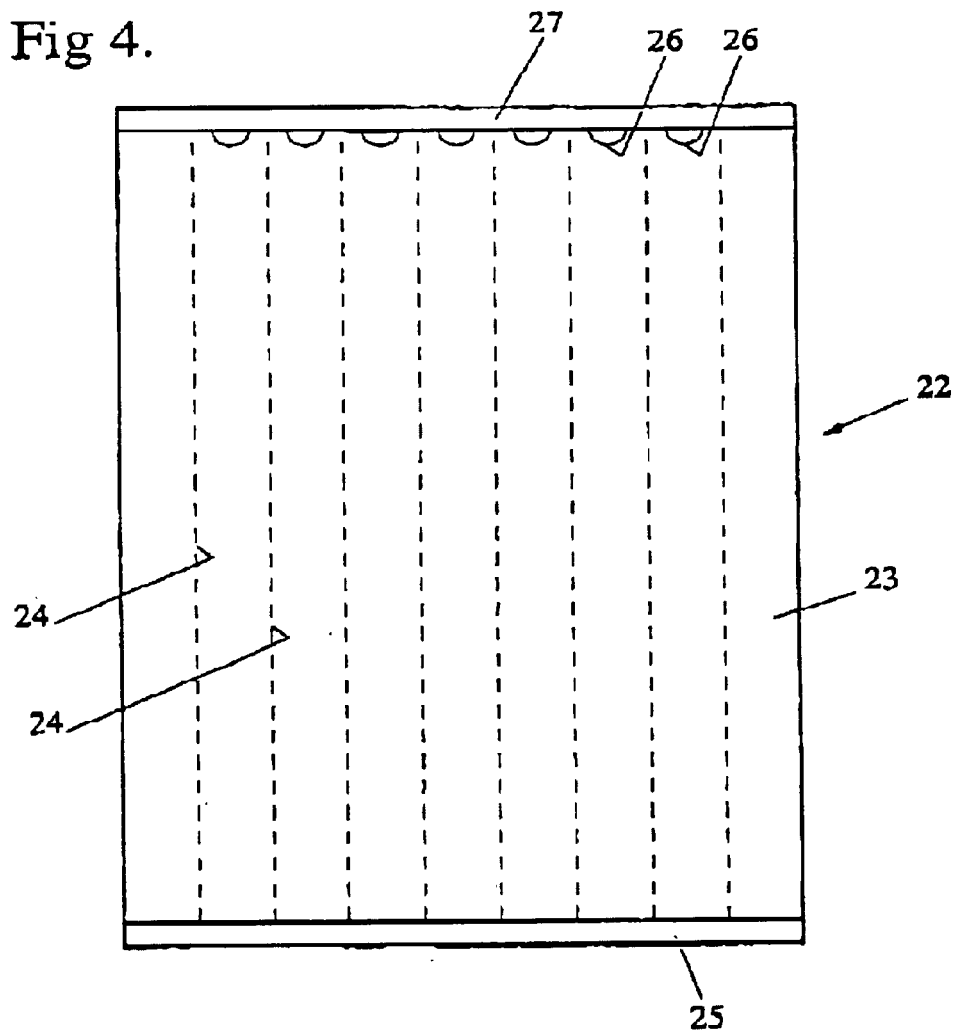
FIG. 4 is a plan view of a first preferred embodiment of the light receiving means according to the present invention.

Referring initially to FIG. 1, the industrial press safety system according to the present invention includes a laser emitting means 1 having a laser emitter 2, for example a laser diode, and a lenses assembly B for converting the laser beam 3 emitted from the laser emitter 2 into a continuous planar laser beam 9.

FIG. 2 is a cross section of the continuous laser beam 9 emitted by the laser emitting means 1 taken along line A—A of FIG. 1 prior to correction. This laser beam 9 has a generally constant lateral width W along its' elongate extent. Furthermore, the continuous planar laser beam 9 has a generally constant thickness T. According to one possible configuration of the present invention, the laser beam 9 can have a lateral width of about 50 mm on average and a thickness of 3 mm on average. The angle of dispersion of the laser beam 9 is preferably equal to or less than 0.1%. It should be appreciated that alternative configurations are possible in dependence on the application of the safety system.

Returning to FIG. 1, the lens assembly 8 includes a cylindrical prism 5 for initially expanding the laser beam 3 into a planar fan shaped beam 6. This planar fan shaped beam 6 then passes through a converging lens 7 for refocusing the fan shaped beam 6 into the planar laser beam 9 having a generally constant lateral width. It has been found that the right intensity when measured across the lateral width of the planar laser beam 9 will vary across that lateral width. This variation of light intensity is not normally visible to the eye. FIG. 2 nevertheless schematically shows the light intensity variation, with areas 10 of increased light intensity distributed across the lateral extend of the last beam 9. It is considered that this is due to the refractive effect of the lenses 5, 7 which causes the parallel "lines of light" of the initial laser beam 3 to be deflected such that they are no longer parallel in the planar laser beam 9 emitted from the converging lens 7. A correcting lens 11 is therefore placed in front of the converging lens 7 to straighten the lines of light of the laser beam 9 so that they are generally parallel. The correcting lens 11 can be in the form of a lenticular lens having a plurality of lens sections which respectively straighten the portion of the laser beam passing through that section. It is however also envisaged that a plurality of parallel lenses may be placed side by side in front of the converging lens 7, each lens correcting a respective portion of the laser beam 9. The correcting lens 11 could alternatively be replaced by a lens series 17 including a concave lens 11 and convex lens 19 located one after each other and shown in dotted outline in FIG. 1. It is also envisaged that the lens series 17 could be used in conjunction with the lenticular lens 11. Furthermore, additional correcting lenses could be added depending on the accuracy of the focusing required.

FIG. 3 helps to illustrate better the effect of not correcting the lines of light schematically shown as lines 15 in FIG. 3. Where the planar laser beam 9 is left uncorrected from the converging lens 7, this results in an "overlapping" of the lines of light 15. By comparison, in the initial laser beam 3 from the laser emitter 2, the lines of light would be parallel, a typical characteristic of laser beam 5. Therefore, when an object intersects the planar laser beam 9, the overlapping of the lines of light 15 obliterates any shadow cast by the object 20. Therefore, the receiving means 22 will not detect any significant change in the light intensity of the planar laser beam 9 received by the light receiving means 22. The deflection of the lines of light is typically less than 0.1°. Nevertheless, because of the long transmission distances, the non-parallel nature of the uncorrected planar laser beam 9 will have a significant effect on the operation of the safety system.

FIG. 4 shows in detail the construction of the light receiving means 22. This light receiving means 22 includes a plurality of electronic light receivers 26 aligned along a straight line. To eliminate the effect of light other than that received from the planar laser beam 9, each light receiver 26 is placed at the end of an elongate cylindrical passage 24 provided within a solid block 23. The light receiving means 22 further includes a base plate 27 for supporting the light receivers 26 and a front transparent cover 25 for covering the inlet opening of the cylindrical passages 24.

Figure 5:
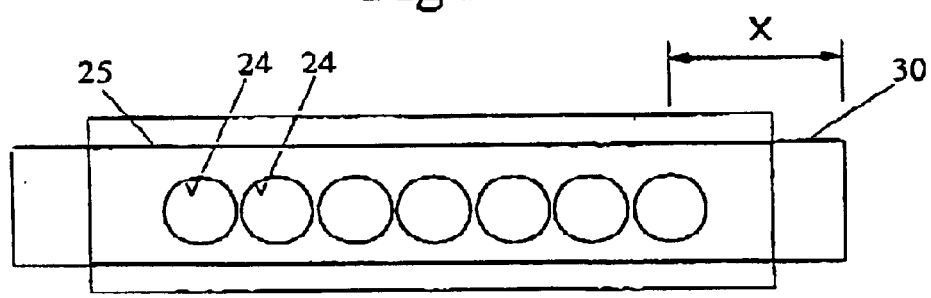
FIG. 5 is an end view of the light receiver assembly of FIG. 4.

FIG. 5 is an end view of the light receiving means 22 showing the aligned cylindrical passages 24 covered by the transparent cover 25. The planar laser beam 9 is simultaneously received by all of the light receivers 26, the area of the laser beam shining on the light receiving means 22 being shown in dotted lines 30. It can be seen that any lateral movement of the laser beam 9 due to vibration of the industrial press will not normally effect the operation of the safety system, with the laser beam 9 still being received by all of the light receivers 26 unless it is bent more than the distance X as shown in FIG. 5. Most of the vibration within industrial presses such as a press brake result, in side to side motion. Therefore, the effect of vibrating on the laser beam 9 is minimised by aligning the plane of the laser beam 9 horizontally. It is therefore generally not necessary to provide any software correction for the signals produced by the light receivers 26 due to the effect of vibration on the laser beam 9.

Figure 6:
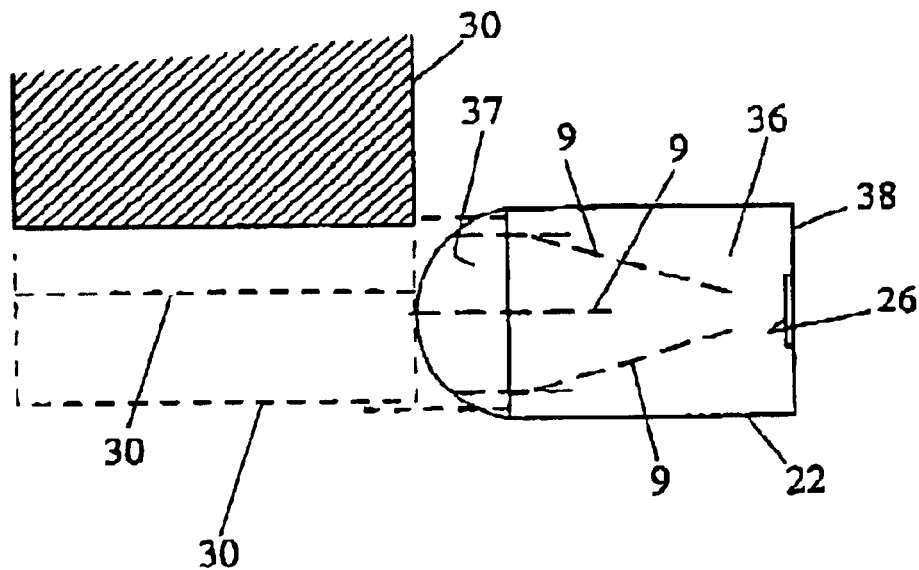
FIG. 6 is a side view of a second preferred embodiment of the light receiving means according to the present invention.
Figure 7:
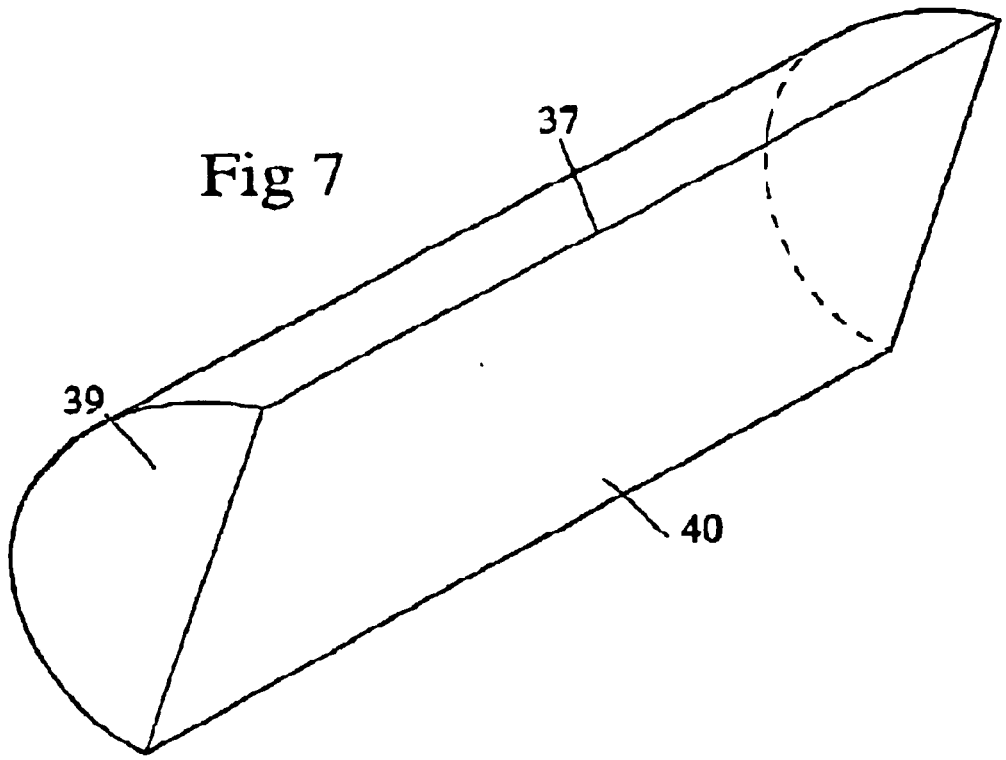
FIG. 7 is a perspective view of the cylindrical lens of FIG. 7.

An alternative preferred embodiment of the light receiving means 22 of present invention is shown in FIG. 6. Features which correspond to the arrangement shown in FIGS. 4 and 5 are designated with the same reference numeral. The light receivers 26 are located in the rear of an enclosure 38 and a "cylindrical" lens 37 is located in front of the light receivers 26 and extending in front of all the light receivers 26. The cylindrical lens 6, which is shown in perspective in FIG. 7 has a forward side 39 with a constant radius of curvature. The rear side 40 of the lens 37 is generally flat. The cross-section of the lens 37 is generally constant along its length. In practice, the lens 37 is located in front of all the light receivers 26 so that the curve of the forward side of the lens 37 is running in a vertical plane. Such a lens 37 is typically about 50 mm in height. A series of parallel and generally vertical dividing walls 35 are provided with the enclosure 38 to separate the enclosure 38 into a series of parallel light receiving passages 24, with a light receiver 28 being provided at the end of each passage 24. It is however also possible to use a hollow enclosure 38 without any partitions as previously discussed.

Having such a cylindrical lens 37 ensures that whenever the laser beam 9 hits the lens 37 in the vertical plane, the light is focussed back to the light receivers 25 in that one plane. In other words, the lens 37 focuses light in one plane only. Such lens 37 also have a fixed focal point. This arrangement also ensures that the laser beam 9 will only be directed to the light receivers 26 if the beam 9 is horizontal (ie perpendicular) to the lens 37. The lens may allow a tolerance from the horizontal plane of typically about 1°, although this tolerance may be adjusted. This means that the light receivers 26 will only accept the laser beam 9 if it is running parallel to the component of the press being controlled, for example a movable blade 30 as shown in FIG. 6. The dividing walls 36 within the enclosure 38 act to ensure that the light is coming straight to the light receivers 26 within said tolerance in this horizontal plane.

It is, however, also envisaged that a plurality of separate lenses be provided in front of the high receivers 26, with each lens focussing a respective section of the light beams. In this arrangement, the lenses could be of the more conventional circular type.

FIG. 6 shows in dotted lines other positions of the leading edge of the blade 30 where different blades 30 are used. The laser beam 9 must therefore be repositioned for each different blade 30 as shown in FIG. 6. The use of such a cylindrical lens 37 therefore allows the laser beam 9 to be at different heights due to differences in the depth of the blade 30 while still allowing the laser beam 9 to be focussed to the light receivers 2G.

The light receivers 26 are positioned close together to thereby allow the laser beam 9 to be received across the width of the field of that laser beam 9. These light receivers 26 can be grouped to receive different segments of the beam 9, eg front section, mid section and rear section. This is so that, if required, an intersection of the laser beam 9 in different sections of the laser beam 9 can be responded to in different ways. For example, the intersection of the front section can result in the stopping and "jump back" of the movable blade 30. Intersection of the mid section of the laser beam 9 is used to trigger a "mute point" setting as well as provide a stop and jump back response of the blade 30. The mute point is the point beyond which the blade 30 will travel even if there is an intersection of the laser beam 9. Normally the laser beam 9 is triggered a short distance (typically approximately 4 mm) before it reaches the surface of the material to be bent and muted (ie. desensitized) to allow the bending process. It is considered that, at this distance, the smallest obstruction (ie a finger) could not be present. Finally, intersection of the rear section of the laser beam 9 will stop the blade 30, but without any jump back thereof. Also when switched into a special mode of operation, this rear section can be muted a few millimeters further away from the material being bent. Therefore, if a back gauge 50, a standard apparatus on many press brakes, is brought in close to the blade 30 to do very short bends so that it is close enough to intrude onto the rear section of the laser beam 9, the back gauge 50 will not interrupt the bending process (see FIG. 8). This muting of the rear section of the laser beam 9 early, is considered safe because:

1. The roar of the press is far less likely to be accessed by the operators (and assistants) in normal working conditions; and
2. To help compensate (in this special mode only) the blade 30 stops at the mute point and needs a further foot switch application for the closing operation. This also ensures the operator knows he is in this special mode.

The safety system according to the present invention may also provide other responses, for example, when the press is required to manufacture a box or tray where the sides thereof may be upstanding and may therefore intersect the laser beam 9 as the blade comes down. Therefore at a tray model of operation, when laser beam front section only is interrupted the first time, the blade 30 stops. If at least one of the other sections of the laser beam 9 are clear, then the safety system allows a closing movement of the blade 30 after foot switch operated under this tray mode. This is to allow the sides of a tray or box to interrupt the front section of the laser beam 9 while still allowing the blade 30 to continue to move. The rear section of the laser beam 9 may also need to be "muted" to allow the end wall of the tray to be formed. Therefore, the blade 30 will initially stop when the rear section is intercepted, but will continue following the pressing of the foot switch if the centre section is still clear. This mode always gives full protection of the full width of the laser beam 9 down to the upstand on the tray or box and, after a stop, only allows downward movement if the portion of the laser beam 9 directly under the blade 30 is still clear ensuring that fingers are not left under the blade in the final closing movement.

FIG. 8 is a schematic cross sectional view showing the position of the planer laser beam 9 relative to the blade 30 and anvil 35 of a press brake. The planar laser beam 9 is located closely adjacent to the leading edge 32 of the blade 30, the plane of the laser beam 9 being generally horizontal. The laser emitting means 1 and light receiving means 22 can be mounted on the blade 30 (see FIG. 9a) or on the support structure (not shown) for the blade 30. Therefore, where the press brake is of the type having a movable blade 30, the safety system will move together with the blade 30. Also shown is the movable back gauge 50 previously referred to.

FIG. 9a shows the laser emitting means 1 and light receiving means 22 supported on brackets 45, 46, on the blade 30 of a press brake. This is applicable for both upstroking and downstroking press brakes.

The laser beam 9 is typically set at a distance in the press of 8 mm between the leading edge of the blade 30 and the centre line of the light beam 9. There is some tolerance allowed but essentially this distance must be equal to or greater than the stopping distance of the blade 30 after it has a stop signal.

The emitting means 1 and light receiving means 22 can be mounted on adjustable brackets 45, 46, so they can be accurately adjusted to this distance whenever the blade 30 is changed for different bending processes. (The vertical depth of these blades 30 can often vary.) The adjusting brackets 45, 46, are refined to make these adjustments relatively easy but due to the accuracy needed with laser beams 9, it does need some work by the operator to get both ends aligned properly.

The press will never operate until both ends are aligned and the light receiving means 22 is receiving from the laser emitting means 1.

The use of the cylindrical lens 37 is the light receiving means 22 allows it to be set at a height that can accommodate the shortest blade 30 and it will accept any blade, for example up to 50 mm deeper.

Figure 9B:
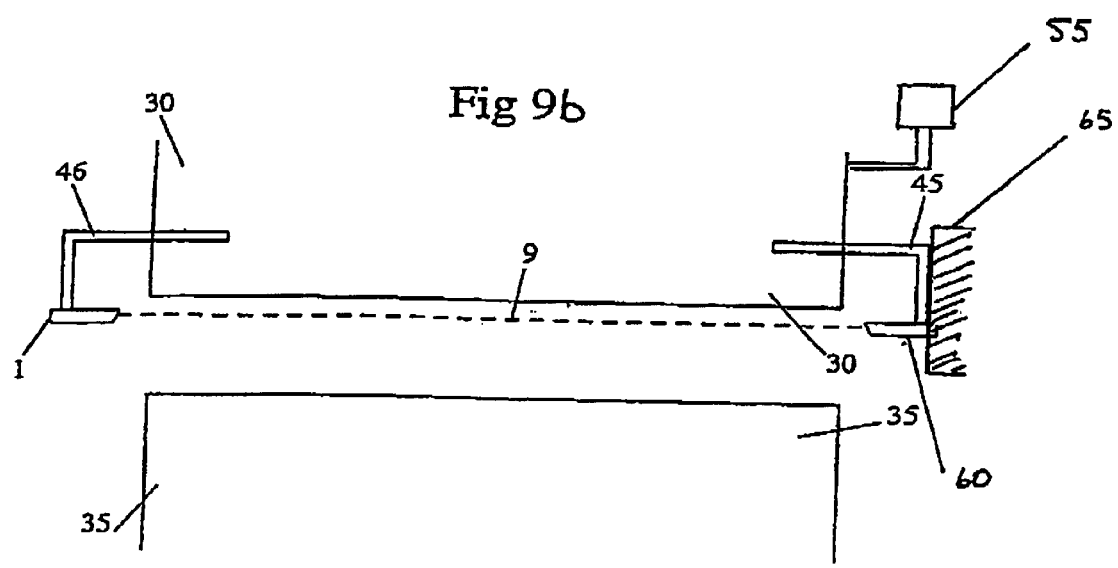
FIG. 9b is a schematic view of the safety system in a further embodiment mounted on an industrial press.

As shown in FIG. 9b, this means that the light receiving means 60 can stay fixed 65 (only adjusted if the blade has an excessive depth) and the light emitting means 1 is adjusted vertically to suit the blade 30. Because of this overall design, the adjusting for varying blades and alignment of either the emitter end or of both ends is very easy in this vertical plane. Thus also helps with any vibration. Vibration of the system, and the necessary alignment issues, as raised on page 6 line 12, may be accommodated. The adjusted width as shown in FIG. 5 permits a direct signal to be provided to the control means 55 and so minimizing any delay caused by unnecessary breaking of the press.

What is claimed is:

1. A safety system for an industrial press having a moveable section, the safety system comprising:
   a laser emitting means for emitting a continuous planar laser beam having a generally constant lateral width;
   a light receiving means for receiving the laser beam and for detecting when an object intersects the laser beam; and
   a control means for stopping or preventing a movement of the moveable section of the press when the receiving means detects that the laser beam has intersected an object.

2. A safety system according to claim 1, wherein the industrial press has a blade and an anvil moveable relative to each other, the safety system being locatable such that the planar laser beam is emitted immediately adjacent the leading edge of the blade.

3. A safety system according to claim 2, wherein the plane of the planar laser beam is at least substantially horizontal and is locatable between the blade and anvil of the press brake.

4. A safety system according to claim 2, wherein the plane of the planar laser beam is at least substantially vertical and is locatable in front of the blade.

5. A safety system according to claim 2, wherein the laser emitting means and the light receiving means is mountable on or immediately adjacent the blade, and is movable with the blade when it is the moveable section of the press.

6. A safety system according to claim 1, further comprising a plurality of laser emitting means and associated said light receiving means for emitting a plurality of said planar laser beams.

7. A safety system according to claim 1, wherein the laser emitting means includes a laser emitter for emitting a laser beam, and a lens assembly for varying the configuration of the laser beam into a said planar laser beam of generally planar shape and having a generally constant lateral width.

8. A safety system according to claim 7, wherein the lens assembly includes a cylindrical prism for initially expanding the laser beam into a laser beam having a planar fan shaped configuration, and a converging lens for refocusing the fan shaped laser beam to a planar laser beam having a generally constant lateral width.

9. A safety system according to claim 8, wherein the lens assembly further includes at least one correcting lens provided after the converging lens for straightening the lines of light of the planar laser beam.

10. A safety system according to claim 9, wherein the correcting lens includes a lenticular lens formed from one or more lens sections.

11. A safety system according to claim 9, wherein the correcting lens includes a lens series having at least one convex and at least one concave lens.

12. A safety system according to claim 7, wherein the light receiving means includes a receiver body, and a plurality of light receivers aligned along a common axis as a light receiver array and located at one end of the receiver body, wherein each light receiver is located at one end of a respective light receiving passage provided through the receiver body.

13. A safety system according to claim 7, wherein the light receiving means includes a receiver body, a plurality of light receivers aligned along a common axis as a light receiver array and located at one end of the receiver body, and a lens provided at the opposing end of the receiver body for focusing the planar laser beam onto the light receivers.

14. A safety system according to claim 13 wherein the lens is a cylindrical lens, the lens focusing the planar laser beam onto the light receivers even when the planar laser beam is displaced laterally from a plane extending through the light receivers.

15. A safety system according to claim 14, wherein the receiver body is an enclosure separated into separate parallel passages by dividing walls.

16. A safety system according to claim 12, wherein the width of the planar laser beam is wider than the length of the light receiver array.

17. A safety system according to claim 12, further including an electronic control unit for receiving control signals from the light receivers and for controlling the operation of the press, wherein the press is stopped when the receipt of the light of the planar laser beam to at least one of the light receivers is blocked due to a breaking of the planar laser beam.

18. A safety system according to claim 17, wherein the light receivers are grouped into a separate sections, with each section of light receivers providing a separate control signal to the electronic control unit.

19. A safety system according to claim 1, wherein both the laser emitting means and the light receiving means are respectively mounted on supports on opposing sides of the moveable section of the press, wherein at least one of the supports is adjustable to allow the alignment and position of at least one of the laser emitting means or the light receiving means to be adjusted.

20. A safety system according to claim 1, wherein the laser emitting means is mounted on a support on one side of the moveable section of the press, such that the support is adjustable to allow the alignment and position of the laser emitting means whilst the laser receiving means remains in a fixed position.

21. A safety system according to claim 1, wherein the angle of dispersion of the planar laser beam is equal to or less than 0.1 degrees.

22. A safety system for an industrial press having a moveable section, the safety system comprising:
   a laser that emits a continuous planar laser beam having a generally constant lateral width;
   a light receiver, aligned with the laser, that receives the laser beam and detects when an object intersects the laser beam; and
   a control, in electronic communication with the light receiver, that is capable of stopping or preventing a movement of the moveable section of the press when the light receiver detects that the laser beam has intersected an object.

* * * * *